United States Patent [19]

Cowles, Sr.

[11] Patent Number: 4,469,380
[45] Date of Patent: Sep. 4, 1984

[54] LINEAR MOVEMENT ANTI-FRICTION BEARING

[75] Inventor: John H. Cowles, Sr., Bristol, Conn.

[73] Assignee: The Torrington Company, Torrington, Conn.

[21] Appl. No.: 553,869

[22] Filed: Nov. 21, 1983

Related U.S. Application Data

[63] Continuation of Ser. No. 379,622, May 19, 1982, abandoned.

[51] Int. Cl.³ .............................................. F16C 29/06
[52] U.S. Cl. ..................................................... 308/6 C
[58] Field of Search .............. 308/6 R, 6 A, 6 B, 6 C, 308/201

[56] References Cited

U.S. PATENT DOCUMENTS

| | | | |
|---|---|---|---|
| 2,452,117 | 10/1948 | Ferger | 308/6 C |
| 2,559,292 | 7/1951 | Ferger | 308/6 C |
| 2,576,269 | 11/1951 | Thomson | 308/6 C |
| 3,265,449 | 8/1966 | Jahn | 308/6 C |
| 3,582,160 | 6/1971 | Schutz | 308/6 C |
| 4,025,128 | 5/1977 | Geffner | 308/6 C |
| 4,357,056 | 11/1982 | Olschewski et al. | 308/6 C |

Primary Examiner—Stuart S. Levy
Assistant Examiner—David Werner
Attorney, Agent, or Firm—F. S. Troidl

[57] ABSTRACT

The linear movement bearing has an inner race and an outer race. The outer race has a plurality of circumferentially-separated axially centered lands on its inside periphery.

An annular retainer is provided in the space between the inner race and the outer race. The retainer has a plurality of circumferentially-separated pockets. A separator is centrally located within each of the pockets to form axially-extending pairs of first and second guideways and reversing guideways at the axial ends of and interconnecting each pair of first and second guideways to form continuous closed paths. Rolling members fill each continuous closed path.

All rolling members always contact the inner race. The lengths of the outer race lands and the circumferential separation of the lands are such that the rolling members in the first guideways contact the lands while the rolling members in the second guideways and reversing guideways do not contact the outer race.

1 Claim, 7 Drawing Figures

LINEAR MOVEMENT ANTI-FRICTION BEARING

This application is a continuation of application Ser. No. 379,622, filed May 19, 1982 now abandoned.

This invention relates to anti-friction bearings. More particularly, this invention is a new and improved anti-friction, linear movement bearing.

For many applications it is highly desirable to use a linear movement anti-friction bearing which requires little space and yet provides the required load-carrying capacity. Thus, a linear movement bearing which has a low profile or smaller diameter is preferred to a higher profile or larger diameter linear movement bearing with the same load-carrying capacity.

In many currently-used anti-friction, linear movement bearings, the force-transmitting bearing elements such as balls, are divided between a plurality of continuous closed paths. In some of these bearings the construction of the retainer used to maintain the elements in the closed, continuous path and the construction of the outer race is such that the number of bearing lands is severely limited, thus limiting the load-carrying capacity. Also, bearings of this tpe have a rather large profile, or diameter. Some linear movement bearings use a machined outer race which have either a machine return path contour machined into the outer race whereby the bearing elements prevent axial movement of the retainer or are provided with retaining rings at either end of the bearing to prevent axial movement of the retainer. In the case where a return path is machined into the outer race, it is necessary to assemble the bearing elements through a hole provided in the outer race—one bearing element at a time.

Other currently-used linear movement, anti-friction bearings include a retainer with the separator attached to the retainer at one or both of its ends and is assembled into the finished bearing with the separator so attached. The employment of such attaching means necessitates that extra clearance be machined in the outer race so that the bearing elements may pass over the attaching means without transmitting force between the inner race and outer race. This machining of the outer race necessitates an increase of the bearing profile or diameter by the thickness of the attaching means.

Examples of currently-known linear movement bearings which require an unnecessarily large profile are illustrated by the bearings shown in U.S. Pat. No. 4,025,128 and the bearings shown in U.S. Pat. No. 4,239,298.

This invention is a linear movement, anti-friction bearing of relatively low profile and has a larger load-carrying capacity with the same diameter bearing than was possible in prior bearings and also provides a bearing in which axial movement of the retainer is restricted without the use of separate retaining rings.

Briefly described, the linear movement bearing includes an inner race and an outer race. The outer race has a plurality of circumferentially-separated, radially, inwardly-extending axially centered lands on its inside periphery. An annular retainer is provided in the space between the inner race and the outer race. The retainer has a plurality of circumferentially-separated pockets formed therein. A separate separator is centrally located within each of the pockets to form axially-extending pairs of first and second guideways for rolling members, and reversing guideways at the axial ends of and inter-connecting each pair of first and second guideways to form continuous closed rolling member paths. A plurality of rolling members fill each continuous path. The rolling members always contact the inner race with the lengths of the outer race lands and the circumferential separation of the lands being such that the rolling members in the first guideways contact the lands while the rolling members in the second guideways and reversing guideways do not contact the outer race.

The invention, as well as its many advantages, may be further understood by reference to the following detailed description and drawings in which.

and

Figure 7:
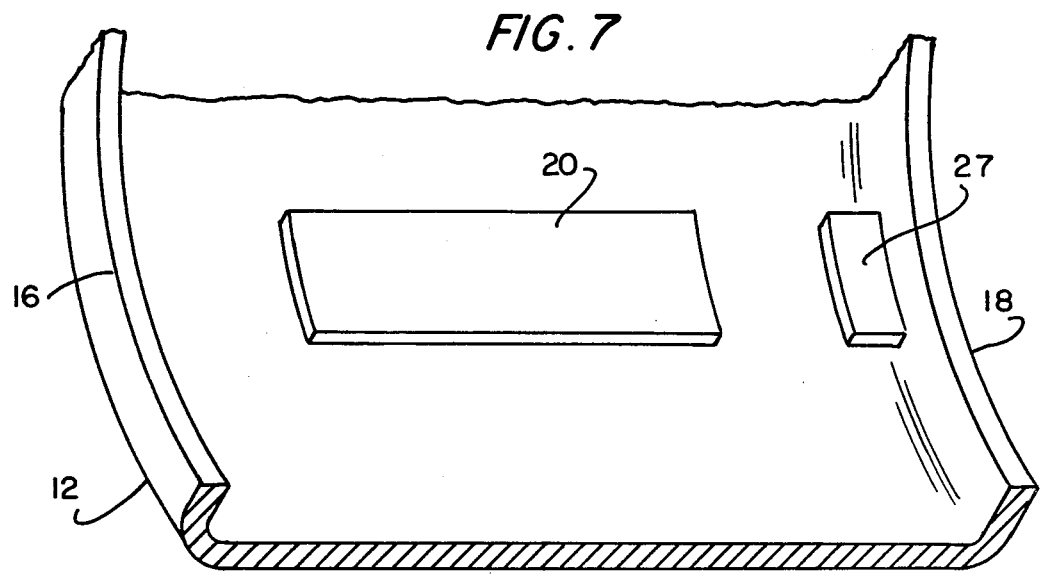

FIG. 7 is a fragmentary perspective view of a portion of the outer race.

In the various figures, like parts are referred to by like numbers.

Figure 1:
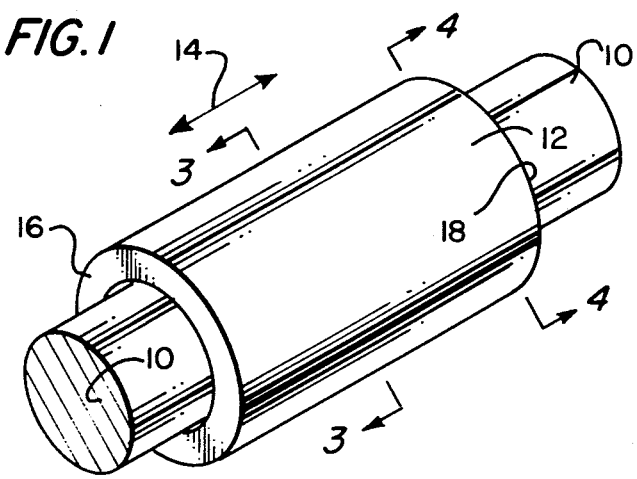
FIG. 1 is a perspective view of a preferred embodiment of the invention.
Figure 2:
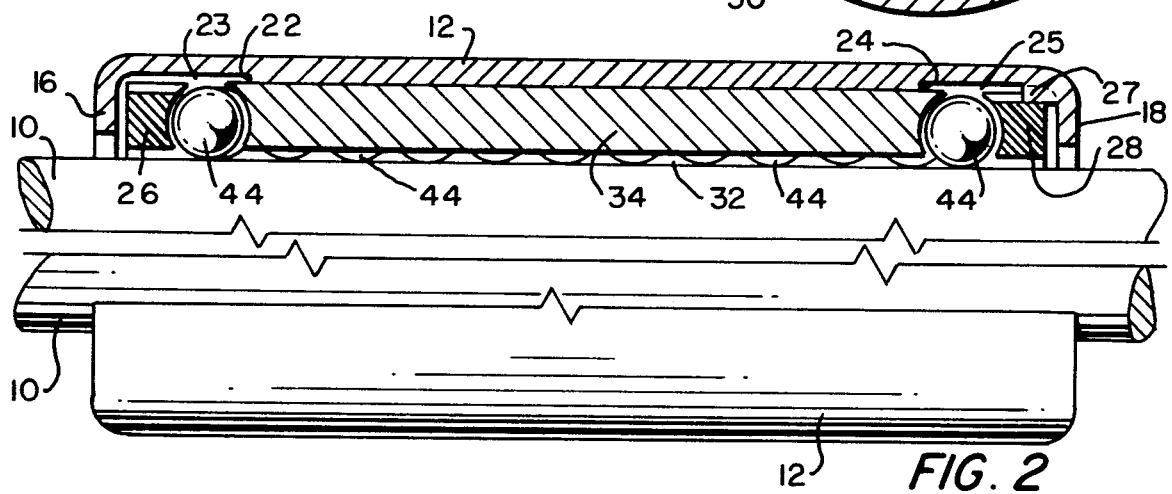
FIG. 2 is an elevational view, partly in section, of the bearing shown in FIG. 1.

Referring to the drawings, and more particularly to FIG. 1 and FIG. 2, the new linear movement bearing includes an inner race, which may be a shaft 10. The outer race 12 is movable relative to the shaft or inner race 10 in either axial direction as indicated by the double-headed arrow 14. The outer race 12 is preferably a one-piece drawn cup or drawn shell and includes annular end flanges 16 and 18 (see FIG. 2).

Figure 3:
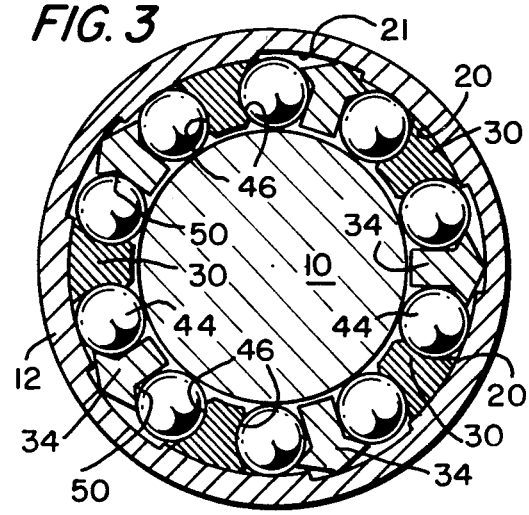
FIG. 3 is a sectional view on an enlarged scale, taken along lines 3—3 of FIG. 1.

Referring to FIG. 3, a plurality of circumferentially-separated, radially, inwardly-extending axially centered lands 20 separated by recesses 21 are provided on the inside periphery of the outer race 12. The axial ends 22 and 24 (see FIG. 2) of each of the lands 20 are axially-spaced inwardly from the annular flanges 16 and 18, respectively, to provide axially extending inside diameter portions 23 and 25 larger than the inside diameter of lands 20. At the end adjacent annular flange 18, outer race 12 has a plurality of circumferentially-separated, radially, inwardly-extending projections 27 (see FIG. 2 and FIG. 7) on its inside periphery.

Figure 4:
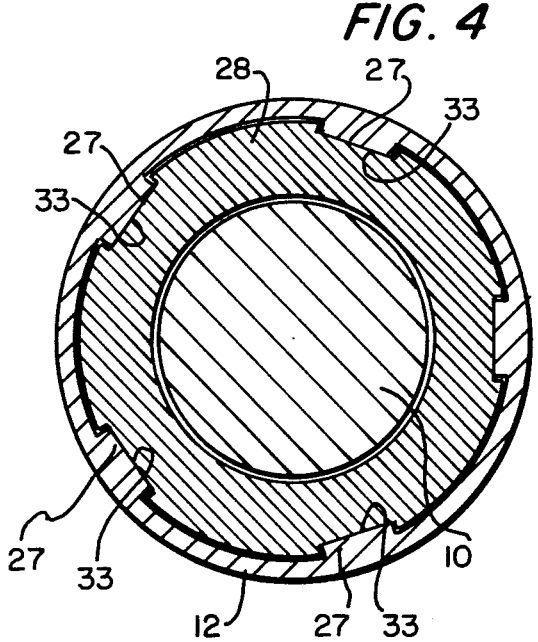
FIG. 4 is a sectional view, on an enlarged scale, taken along lines 4—4 of FIG. 1.
Figure 5:
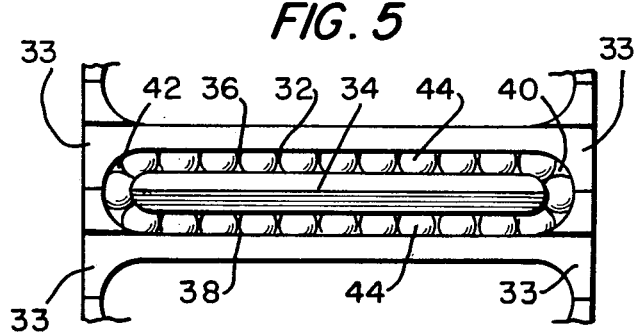
FIG. 5 is a plan view of one continuous closed rolling member path.

A retainer comprising axially-spaced apart annular end rings 26 and 28 interconnected by circumferentially spaced apart interconnecting bars 30 (see FIG. 3 and FIG. 6) is located in the annular space between the shaft 10 and the outer race 12. The interconnecting bars 30 and semi-circular cut-outs in end rings 26 and 28 define circumferentially-separated pockets 32 (see FIG. 5). The annular retainer has a plurality of axially-extending circumferentially separated grooves 33 (see FIG. 4 through FIG. 6) on its outer periphery. Projections 27 on outer race 12 matingly engage grooves 33 in the retainer (see FIG. 4) to properly align the retainer.

A completely separate, disconnected separator 34 is centrally located within each of the pockets 32 to form a continuous closed rolling member path consisting of axially-extending pairs of first guideways 36 and second guideways 38 for loaded and unloaded rolling members, respectively, and semi-circular reversing guideways 40 and 42 at the axial ends of and interconnecting each pair of first and second guideways. Rolling members such as balls 44 completely fill each continuous path. All of the balls 44 are continuously in contact with the inner race or shaft 10. The length of each of the outer race lands 20 is substantially equal to the lengths of the first guideways 36 and the circumferential separation of the lands is such that the balls 44 in the first guideways 36 contact the lands 20 to transmit forces between the shaft 10 and outer race 12 while the balls in the second guideways 38 and the balls in the reversing guideways 40 and 42 do not contact the outer race.

Figure 6:
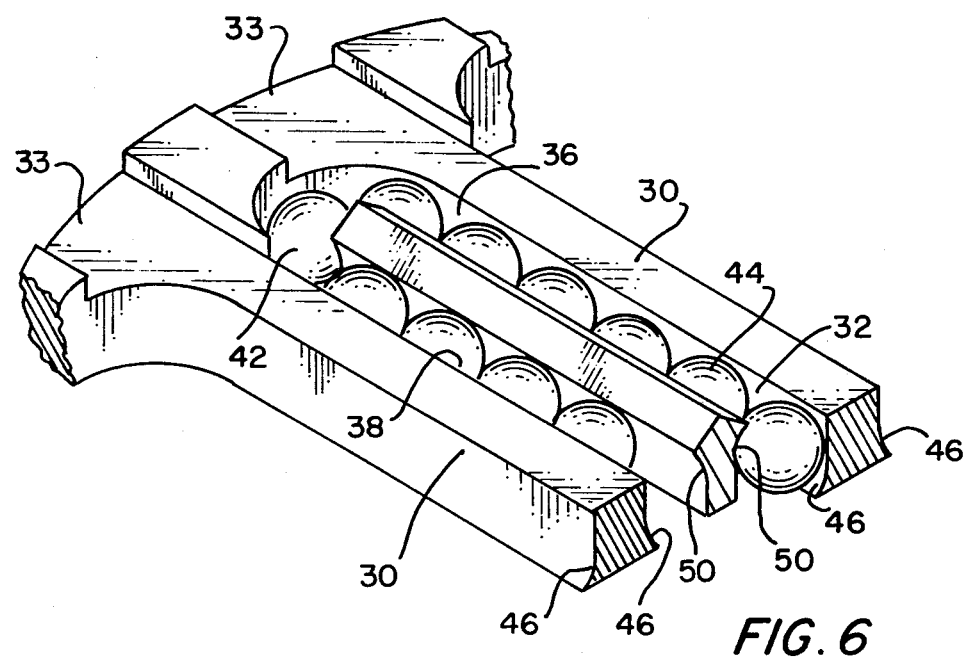
FIG. 6 is a fragmentary perspective view of a section of an assembled retainer, separator, and rolling members.

Referring to FIG. 3 and FIG. 6, the interconnecting bars 30 have curved surfaces which engage the balls 44. The separators 34 have radially, inwardly-tapering shoulders 50.

Preferably, the retainer and separators are of a suitable plastic. Due to the resiliency of the plastic retainer and the plastic separator and the configuration of the retainer and the separators, the balls 44 may be easily put into place in contact with the curved surfaces 46 of the bars 30 and then the separators 34 placed in the center of the pockets, so that the balls 44 contact shoulders 50. The curved surfaces 46 and inwardly tapering shoulders 50 keep the balls 44 radially in place. The separator 34, retainer, and balls 44 then constitute a single assembly. Thus, the assembled retainer, separator, and balls may be simply inserted into the outer race 12. The balls 44 are allowed to transit the reversing guideways 40 and 42 without transmitting force between the inner race 10 and the outer race 12 and the necessity of extra clearance in the outer race is eliminated thereby providing for a bearing with a minimum profile.

By using a drawn shell or drawn cup as the outer race, the assembled retainer, separators, and balls can be easily inserted into the outer race 12, the outer ends of which are then curled over by known press methods to form the annular flanges 16 and 18, thereby eliminating the need for retaining rings and providing an economical, high capacity low profile bearing capable of providing anti-friction, load-carrying capacity linear motion.

I claim:

1. In a linear movement bearing: an inner race; an outer race having a plurality of radially, inwardly-extending, circumferentially-separated lands on its inside periphery the axial ends of each of the lands being axially spaced inwardly from the ends of the outer race to provide axially extending portions of the outer race of larger inside diameter than the inside diameter of the lands; an annular resilient retainer in the space between the inner race and the outer race, said retainer having axially-spaced apart annular end rings interconnected by circumferentially spaced apart interconnecting bars to provide a plurality of circumferentially-separated pockets; a separate, disconnected resilient separator centrally located within each of the pockets, the pockets and the separators being shaped to form axially-extending pairs of first and second guideways for rolling members, and reversing guideways at the axial ends of and interconnecting each pair of first and second guideways to form continuous closed rolling member paths, the interconnecting bars having curved surfaces and the separators having tapered shoulders, said curved surfaces and tapered shoulders being constructed to keep the rolling members radially in place, the resilience of the retainer and the reslience of the separator and the structure of the retainer and the structure of the separators being such that rolling members may be easily placed in the retainer and the rolling members, separators, and retainer held together as a unit assembly; a plurality of rolling members filling each continuous closed rolling member path, all of the rolling members contacting the inner race, the lengths of said outer race lands and the circumferential separation of the lands being such that the rolling members in said first guideways contact the lands, while the rolling members in said second guideways and reversing guideways are radially-spaced from the outer race.

* * * * *